United States Patent
Müller et al.

(10) Patent No.: US 11,504,896 B2
(45) Date of Patent: Nov. 22, 2022

(54) INJECTION-MOLDED PREFORM FOR THE PRODUCTION OF A PLASTICS CONTAINER IN A BLOW-MOLDING PROCESS, PLASTICS CONTAINER PRODUCED THEREFROM, AND PRODUCTION METHOD FOR THE PREFORM AND/OR THE PLASTICS CONTAINER

(71) Applicant: ALPLA Werke Alwin Lehner GmbH & Co. KG, Hard (AT)

(72) Inventors: Florian Müller, Salzburg (AT); Oliver Unterlechner, Bregenz (AT)

(73) Assignee: ALPLA WERKE ALWIN LEHNER GMBH & CO. KG, Hard (AT)

( * ) Notice: Subject to any disclaimer, the term of this patent is extended or adjusted under 35 U.S.C. 154(b) by 0 days.

(21) Appl. No.: 15/950,695

(22) Filed: Apr. 11, 2018

(65) Prior Publication Data

US 2018/0229417 A1    Aug. 16, 2018

Related U.S. Application Data

(63) Continuation of application No. PCT/EP2016/074345, filed on Oct. 11, 2016.

(30) Foreign Application Priority Data

Oct. 14, 2015 (CH) .................................. 01490/15

(51) Int. Cl.
*B65D 1/02* (2006.01)
*B65D 43/16* (2006.01)
(Continued)

(52) U.S. Cl.
CPC .............. *B29C 49/06* (2013.01); *B29B 11/14* (2013.01); *B29C 49/08* (2013.01); *B65D 1/0207* (2013.01);
(Continued)

(58) Field of Classification Search
CPC ..... B29C 49/06; B29C 45/1684; B29B 11/14; B29B 11/08; B65D 1/0207; B65D 1/023; B65D 1/0246; B65D 43/162; B65D 43/16
(Continued)

(56) References Cited

U.S. PATENT DOCUMENTS 4,715,504 A    12/1987    Chang et al.
5,270,011 A *  12/1993    Altherr ............... B01L 3/50825
                                                              220/834

(Continued)

FOREIGN PATENT DOCUMENTS

DE    20 2009 015 668 U1    3/2010
EP        0 302 117 A1      2/1989
(Continued)

OTHER PUBLICATIONS

IMM Staff, Closure Molding Clash: Compression vs. Injection, May 12, 2010, Plastics Today (Year: 2010).*
(Continued)

*Primary Examiner* — Robert J Hicks
(74) *Attorney, Agent, or Firm* — Buchanan Ingersoll & Rooney PC

(57) ABSTRACT

An injection-molded preform is disclosed for production of a plastic container by a blow-molding method with an elongated, tube-like body, which is closed on its one longitudinal end and has a neck section that is provided with a pour opening on its other longitudinal end, which neck section includes an injection molded connection to an injection molded closure part, wherein the closure part includes: a flip-top closure and an annular section with an inner wall, which inner wall rests directly on an outer surface of the neck section and completely encloses an annular area of the outer surface of the neck section.

22 Claims, 5 Drawing Sheets

(51) Int. Cl.
  *B29C 49/06* (2006.01)
  *B29C 49/08* (2006.01)
  *B29B 11/14* (2006.01)
  *B29B 11/08* (2006.01)
  *B29C 45/16* (2006.01)
  *B29C 49/00* (2006.01)
  *B29L 31/00* (2006.01)

(52) U.S. Cl.
  CPC ............ *B65D 43/162* (2013.01); *B29B 11/08* (2013.01); *B29C 45/1684* (2013.01); *B29C 49/0005* (2013.01); *B29C 2949/0791* (2022.05); *B29C 2949/0792* (2022.05); *B29C 2949/08* (2022.05); *B29C 2949/0801* (2022.05); *B29C 2949/0817* (2022.05); *B29C 2949/0822* (2022.05); *B29C 2949/0835* (2022.05); *B29C 2949/26* (2022.05); *B29C 2949/28* (2022.05); *B29C 2949/3008* (2022.05); *B29K 2995/0026* (2013.01); *B29L 2031/7158* (2013.01); *B65D 2543/00083* (2013.01); *B65D 2543/00296* (2013.01)

(58) Field of Classification Search
  USPC ............ 215/43, 237, 235; 220/836–7, 254.3, 220/254.1, 256.1, 257.2, 270, 810, 257.1; 428/35.7
  See application file for complete search history.

(56) References Cited

U.S. PATENT DOCUMENTS

| | | | | |
|---|---|---|---|---|
| 5,447,766 | A * | 9/1995 | Orimoto | B29B 11/08 |
| | | | | 215/12.1 |
| 6,209,762 | B1 * | 4/2001 | Haffner | B65D 47/12 |
| | | | | 222/570 |
| 6,789,689 | B1 | 9/2004 | Beale | |
| 6,811,845 | B2 * | 11/2004 | Nahill | B29C 49/0073 |
| | | | | 264/335 |
| 8,616,406 | B1 * | 12/2013 | Sawicki | B65D 43/164 |
| | | | | 220/837 |
| 8,616,407 | B2 * | 12/2013 | Sawicki | B65D 43/164 |
| | | | | 220/837 |
| 8,857,637 | B2 * | 10/2014 | Darr | B29B 11/14 |
| | | | | 215/44 |
| 2006/0043052 | A1 * | 3/2006 | Lin | B65D 47/0838 |
| | | | | 215/253 |
| 2007/0224374 | A1 | 9/2007 | Kelley | |
| 2009/0134113 | A1 * | 5/2009 | Yan | B65D 41/485 |
| | | | | 215/228 |
| 2012/0132607 | A1 * | 5/2012 | Landman | B65D 1/023 |
| | | | | 215/12.1 |
| 2013/0105481 | A1 | 5/2013 | Sawicki | |
| 2013/0216748 | A1 * | 8/2013 | Siegl | B29D 22/003 |
| | | | | 428/36.6 |
| 2014/0044904 | A1 * | 2/2014 | De Belder | B29B 11/14 |
| | | | | 428/35.7 |
| 2015/0217554 | A1 * | 8/2015 | Cerveny | B29C 66/1222 |
| | | | | 428/36.92 |
| 2015/0336310 | A1 * | 11/2015 | Porter | B32B 27/36 |
| | | | | 220/660 |
| 2015/0343693 | A1 * | 12/2015 | Nogueira | B65D 47/127 |
| | | | | 264/537 |
| 2016/0176566 | A1 * | 6/2016 | Hanan | B65D 1/023 |
| | | | | 215/44 |
| 2017/0320610 | A1 * | 11/2017 | Zoppas | B29B 11/14 |

FOREIGN PATENT DOCUMENTS

| | | | | |
|---|---|---|---|---|
| EP | 1 069 977 | A1 | 1/2001 | |
| EP | 2965816 | B1 * | 9/2019 | ......... B01L 3/50825 |
| GB | 2 246 317 | A | 1/1992 | |
| JP | 2001278293 | A * | 10/2001 | ............ B65D 35/14 |
| WO | WO 99/30883 | A1 | 6/1999 | |
| WO | WO 2007/111896 | A2 | 10/2007 | |
| WO | WO 2014/096666 | A2 | 6/2014 | |

OTHER PUBLICATIONS

International Search Report (PCT/ISA/210) dated Feb. 1, 2017, by the European Patent Office as the International Searching Authority for International Application No. PCT/EP2016/074345.

Written Opinion (PCT/ISA/237) dated Feb. 1, 2017, by the European Patent Office as the International Searching Authority for International Application No. PCT/EP2016/074345.

* cited by examiner

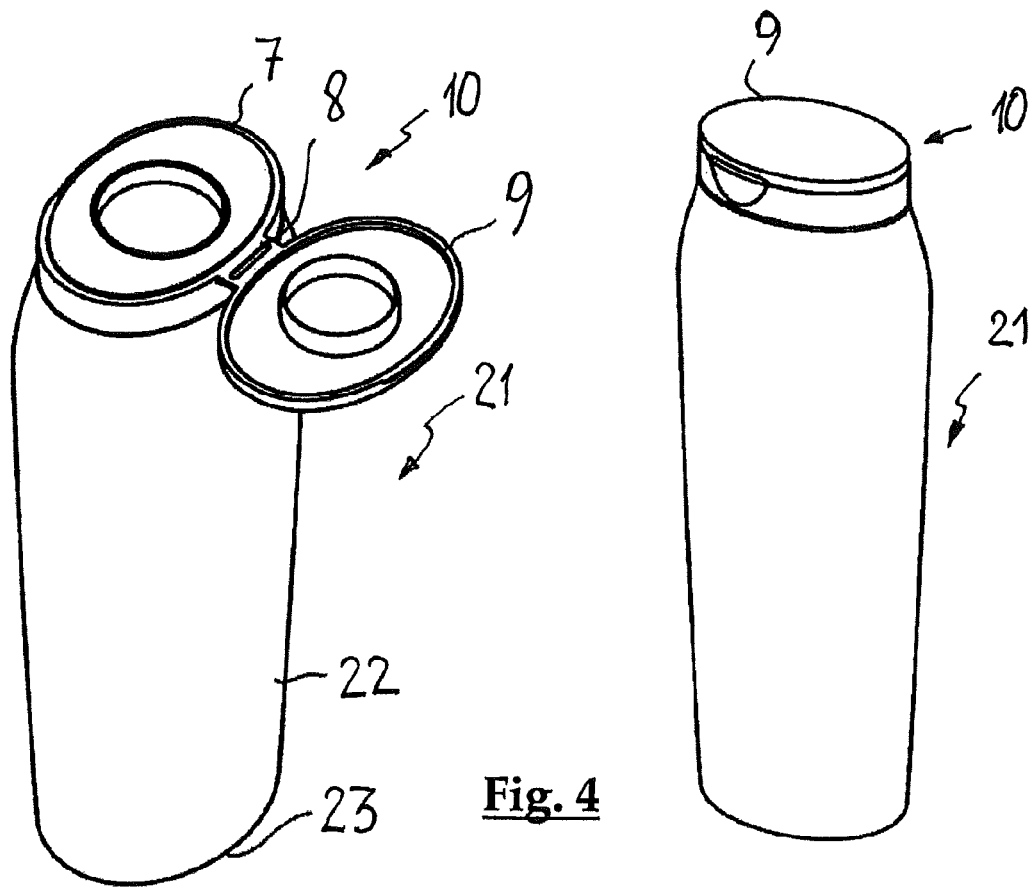
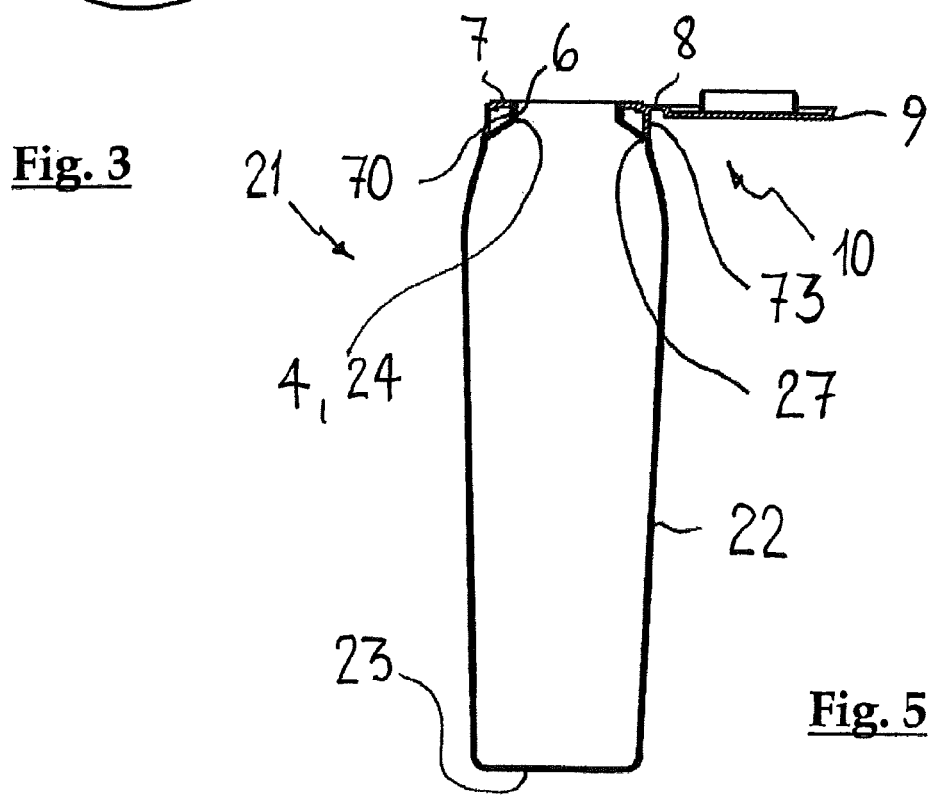
Fig. 3
Fig. 4
Fig. 5

INJECTION-MOLDED PREFORM FOR THE PRODUCTION OF A PLASTICS CONTAINER IN A BLOW-MOLDING PROCESS, PLASTICS CONTAINER PRODUCED THEREFROM, AND PRODUCTION METHOD FOR THE PREFORM AND/OR THE PLASTICS CONTAINER

RELATED APPLICATION

This application claims priority as a continuation application under 35 U.S.C. § 120 to PCT/EP2016/074345, which was filed as an International Application on Oct. 11, 2016 designating the U.S., and which claims priority to Swiss Application 01490/15 filed in Switzerland on Oct. 14, 2015. The entire contents of these applications are hereby incorporated by reference in their entireties.

FIELD

The present disclosure relates to an injection-molded preform for the production of a plastics container in a blow-molding process, a plastic container that is produced from the preform, and a production method for the preform and/or the plastic container.

BACKGROUND INFORMATION

Containers made of tin or multicolored sheet metal, glass or ceramic, common in the past, are increasingly being replaced by containers made of plastic. Primarily plastic containers are now being used in particular for the packaging of fluid substances, for example beverages, free-flowing foods such as ketchup, sugo, pesto, sauces, mustard, mayonnaise, and the like, household products, bodily care products, cosmetics, etc. The low weight and the lower costs certainly play a significant role in this substitution. The use of recyclable plastic materials, the use of bioplastics, and the overall more advantageous total energy balance in their production also contribute to promoting the acceptance of plastic containers, in particular plastic bottles, by consumers.

A large number of the plastic bottles and similar plastic containers now used are produced by a blow-molding method from a preform that is manufactured in an injection-molding method. With this method, first a preform with a usually elongated, tube-like shape is produced by an injection-molding method, which preform is closed with a bottom on one of its longitudinal ends and has a neck section on the other longitudinal end. The production of the preforms can be done separated in time and/or space from the subsequent blow-molding method. In an alternative method, the preform that is produced is further processed immediately after its production without interim cooling. This can be done during so-called injection blow molding using a single mechanical unit, on which the preform is injected, inflated to form a container of the desired shape and demolded. With the blow-molding method, the preform can additionally be stretched in an axial manner by a stretching rod.

As raw materials for the production of preforms, materials are used whose main component (e.g., 90% and more) can consist of, for example, PET, PET-G, HDPE, PP, PE, PS, PVC, PEN, PA, copolymers of the cited plastics, bioplastics, such as, for example, PLA or PEF, filled plastics and/or mixtures of the above-mentioned plastics, in particular mixtures of PP and PE. The plastics or parts thereof can be dyed and/or coated. A consideration for the usable plastics is the suitability thereof, on the one hand, for the respective production method of the preform (e.g., for the injection molding) and the subsequent blow-molding method.

Means for positive clamping of a separate closure part that is equipped with corresponding engagement means can be configured in the neck section of the preform. The means for positive clamping of the separate closure part can be threaded sections or bayonet-like projections or corresponding recesses that are configured, for example, on the outer wall or the inner wall of the neck part. With the blow-molding process, the neck part of the preform is no longer changed. The separate closure part is equipped with corresponding engagement means, which cooperate in a positive manner with the means that are configured in the neck part and thus make possible a repeatable closing and opening of a container that is manufactured from the preform.

In order to reduce or to completely eliminate expense for logistics of bringing together the container and the closure parts that are blow-molded from the preforms, it is proposed in DE 20 2009 015 668 U1 to equip an injection-molded preform integrally with a closure part that is injected at the same time and that is connected to the preform via a hinge that is molded onto the neck section of the preform. The hinge can be configured as, for example, a strap hinge or a film hinge. The closure part is made in two parts and includes a closure cover with a pour opening and a closure cap with a projecting cylindrical extension that in the retracted state projects into the pour opening of the closure cover and closes the latter. The closure cover and the closure cap can also be arranged diametrically opposite to one another and in each case can be connected via individual molded hinges to the neck section of the preform. The handling of the preform with the closure part that is fastened integrally via at least one hinge is not trivial and requires special equipment precautions, so that the closure part and in particular the hinge(s) is/are not damaged with the blow-molding method. A specially configured mold tool is involved, which increases the cost and raises the price for the production of the container from the preform.

SUMMARY

An injection-molded preform is disclosed for production of a blow-molded plastic container, the preform comprising: by a blow-molding method with an elongated, tube-like body, which is closed on one longitudinal end and which has a neck section that is provided with a pour opening on another longitudinal end, which neck section includes an injection molded connection to an injection molded closure part, wherein the closure part includes: a flip-top closure and an annular section with an inner wall, which inner wall rests directly on an outer surface of the neck section and completely encloses an annular area of the outer surface of the neck section.

A method is also disclosed for manufacturing, via a same machine unit, a preform with a closure part, the method comprising: (i) injection molding of a closure part with a flip-top closure in an open position in a first injection mold; (ii) optional cooling of the closure part; (iii) injection molding a preform with preform body and neck section with a pour opening in the closure part in a second injection mold such that an inner wall of an annular section of the closure part rests directly on an outer surface of the neck section of the preform; (iv) cooling of the preform with attached closure part; and (v) demolding of the preform with attached closure part from the second injection mold.

BRIEF DESCRIPTION OF THE DRAWINGS

Further advantages and features follow from the subsequent description of exemplary embodiments with reference to the diagrammatic drawings. In the description of the figures below, the same reference numbers in each case refer to the same parts or components of an injection-molded preform or a plastic container that is produced therefrom by a blow-molding method. In views that are not to scale:

FIG. 3 shows a perspective view of an exemplary plastic container, produced from a preform according to FIG. 1 by a blow-molding method, in the open state;

FIG. 4 shows a perspective view of the plastic container according to FIG. 3 in the closed state;

FIG. 5 shows an axial cutaway view of the plastic container according to FIG. 3;

DETAILED DESCRIPTION

Figure 1:
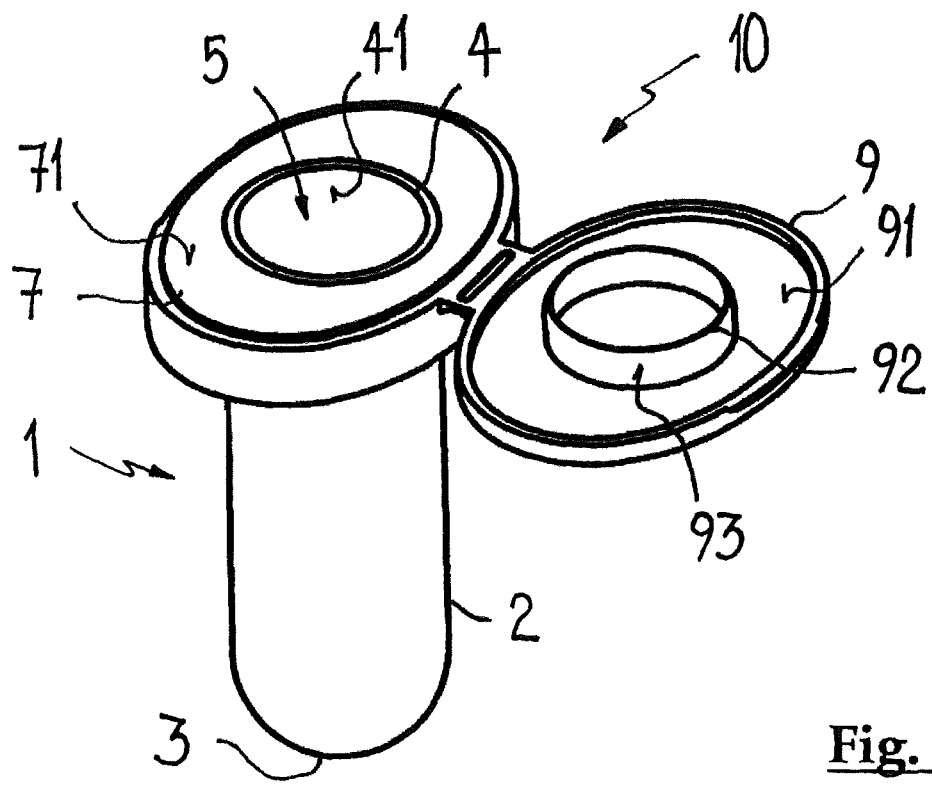
FIG. 1 shows a perspective view of a first exemplary embodiment of a preform that is configured according to the present disclosure.

An injection-molded preform as disclosed herein for the production of a plastics container in a blow-molding method, can have an elongated, tube-like preform body, whose one longitudinal end is closed and to whose other longitudinal end a neck section with a pour opening connects. The neck section is connected by injection molding to a closure part, which includes a flip-top closure, which at the same time is produced by an injection-molding method. The closure part has a section, configured in an annular manner, with an inner wall, which rests directly on an outer surface of the neck section and completely surrounds an annular closed area of the outer surface of the neck section.

An exemplary preform configured according to the present disclosure can have an advantage that its dimension-critical elements are produced by an injection-molding method, which has considerably tighter dimensional tolerances. The closure part that includes a flip-top closure has a section that is configured in an annular manner and that is connected via its entire inner periphery by injection molding with an annular closed area of the neck section of the preform. As a result, a reliable connection between the closure part and the neck section of the preform is ensured. In contrast, for example, to fastening the closure part via a film hinge or a strap hinge, the connection between the closure part and the neck section of the preform is virtually indestructible in a normal handling of the preform. The closure part that includes a flip-top closure and the preform can be produced by a common plastic injection method, for example in a same injection-molding unit. This makes it possible to avoid expense for positionally-accurate relative positioning of the two parts to one another. In this case, the closure part and the preform are produced sequentially, whereby usually first the closure part that includes the flip-top closure and then the preform are injected.

By the closure part and the preform being connected to one another by injection molding, a connection or at least adhesion of the material of the preform to the material of the closure part generally results. In this case, the two materials can be different from one another. As a result, a sealing zone between the closure part and the preform can be eliminated. An exemplary preform according to the disclosure thus can have only a single sealing zone, namely that in the pour opening. The closure part and the preform can have a common longitudinal axis, which, however, is not absolutely necessary. The closure part that has the flip-top closure is no longer changed in the blow-molding method below and retains its dimensions that are defined in the injection-molding process. In the blow-molding method, only the section of the preform that projects into the blow mold is axially and radially stretched or widened.

In an exemplary variant embodiment, the closure part in the attachment area can be connected in a positive manner to the annular surrounded area of the outer surface of the neck section. To this end, for example, an annular groove can be provided in the closure part's inner wall, in which groove a correspondingly configured annular projection engages on the outer surface of the surrounded area of the neck section of the preform. As an alternative, the closure part's inner wall can have an annular circumferential projection, which engages in a groove in the outer surface of the neck section. The groove and the projection do not necessarily have to be configured in an annular circumferential manner.

Another exemplary variant can provide that the groove and the projection are formed from individual segments, which in each case extend only over a partial section of the periphery of the closure part's inner wall or the outer surface of the surrounded neck section. Since the two parts are produced sequentially behind one another in a common injection-molding method, the positive connection of the closure part that has the flip-top closure and the surrounded neck section of the preform can also have any other shapes, for example, can be oval, polygonal or else serrated.

In another exemplary variant embodiment of the preform, the closure part that has the flip-top closure can be connected by friction in the attachment area with the annular surrounded area of the outer surface of the neck section. A frictional connection between the closure part and the surrounded area of the neck section can be achieved, for example, in such a way that the plastic material of the closure part has a greater shrinkage rate than the material of the preform. The frictional connection between the closure part and the neck section can be provided as an alternative or in addition to a positive connection. In order to support a frictional connection, an outer contour of the closure part can be different from its inner contour. Thus, for example, the outer contour can be oval and the inner contour can be circular. In this connection, narrow sides, (e.g., sides that between the inner contour and the outer contour have a smaller distance than other wide sides, in which the distance between the outer contour and the inner contour is larger), can be configured, for example, as linear storage. Linear storage is defined here as the narrow side being extendable compared to the wide side, and it can cause the wide side and the narrow side to be pressed in the preform with a defined force.

In another exemplary variant embodiment of the preform, the closure part that has the flip-top closure can be connected integrally welded in the attachment area, for example, by at least partial melting of the closure part's inner wall that rests on the outer surface of the neck section, with the annular surrounded area of the outer surface of the neck section. The integral connection is in this case created for example, without the prior application of an additional material layer, for example an adhesive or the like, and is only a result of connecting forces between the material of the closure part and that of the preform that are injected in the hot state. The integral connection between the closure part that has the flip-top closure and the surrounded area of the neck section of the preform can be carried out as an alternative or in addition to a positive and/or frictional connection between the two parts.

An exemplary variant of the preform according to the disclosure can be distinguished in that the closure part and the preform includes (e.g., consists of) plastic materials that are different from one another. The designation of various plastic materials in this case also includes similar plastic materials, which, however, can contain various additives and therefore can have properties that are different from one another.

In an exemplary embodiment of the preform, at least 90% of the closure part that has the flip-top closure includes (e.g., consists of) a plastic from the group that consists of polyolefins, in particular polypropylene or polyethylene, polyamide, PET, as well as rubberlike substances, such as, e.g., TPE. The listed materials are sufficiently known with respect to their properties and can be used, for example, for the production of pour or metering attachments, closures or the like.

In another exemplary variant embodiment of the preform, at least 90% of the preform body with neck section includes (e.g., consists of) a plastic from the group that consists of PET, PET-G, HDPE, PP, PE, PS, PVC, PEN, PA, copolymers of the cited plastics, bioplastics such as, for example, PLA or PEF, filled plastics and/or mixtures of the above-mentioned plastics, in particular mixtures that consist of PP and PE. A condition for the usable plastics is, on the one hand, the suitability thereof for the production of the preform in an injection-molding method and for the subsequent blow-molding method, which can also be, for example, a stretch-blow-molding method, in which the preform is stretched in the axial direction with the blow-molding method additionally by means of, for example, an elongated mandrel. Plastics or plastic mixtures that are at least partially transparent can be especially advantageous.

In another exemplary variant embodiment of the disclosure, the closure part that has the flip-top closure and the preform body with neck section can have colors that are different from one another at least in places. A variable tinting of the closure part and the preform body with neck section can be provided for aesthetic reasons, for reasons of increasing recognition value, but also for functional reasons.

In an exemplary embodiment of the disclosure, the closure part having the flip-top closure and/or the preform body with neck section can be made to be transparent at least in places. In this way, for example, the filling state of a container that is produced from the preform can be checked later. For example, a fill level indicator that runs in the axial direction can be produced. Finally, partial transparency may also be desired just for aesthetic reasons.

In an exemplary variant embodiment of the preform according to the disclosure, the section of the closure part that has the flip-top closure and that completely surrounds the annular closed area of the outer surface of the neck section can have a height that is measured in an axial extension direction of the preform, which is at least 1 mm. In connection with the usual wall thicknesses of the annular section of the closure part, which does not fall below, for example, 0.5 mm, the closure part also can have a strength that is sufficient for it to be functional even in the case of these minimum dimensions.

In another exemplary variant embodiment of the disclosure, the preform body with neck section has an axial length that is 2 mm to 500 mm, preferably 10 mm to 500 mm. The wall thicknesses of the preform in this case correspond to those of known preforms. In this case, a wall thickness of the preform can lie within an exemplary range of 0.5 mm to 10 mm. Depending on the axial length of the preform, dish-like containers, beaker- or capsule-like containers, flask-like containers or even canister-like containers can be produced therefrom.

In an exemplary variant embodiment of the disclosure, the pour opening at the neck section has a diameter that is, for example, 3 mm to 180 mm, preferably 10 mm to 100 mm. Due consideration is given to the minimum opening diameter by virtue of the fact that, on the one hand, with the injection-molding method, a core bounds the mold cavity in the direction of a center, and, on the other hand, with the blow-molding method, a blow-molding pin or stretch-blow-molding pin is driven into the interior of the preform through the pour opening. The maximum opening diameter follows from the type of container that is to be produced from the preform in the blow-molding method. Thus, for example, so-called wide-necked containers have a considerably larger opening diameter than flask-like containers in order to facilitate the removal of decanted material, for example with a spoon or the like.

In another exemplary variant embodiment of the disclosure, the closure part's inner wall that has the flip-top closure and that rests on the outer surface of the preform can have an inner contour that is different from an outer contour of the closure part. In this connection, for example, the outer contour can be matched to an oval container, while the inner contour follows a circular pour opening.

The flip-top closure of the closure part can be fastened in one piece via a hinge to a cuff that surrounds the neck section. Flip-top closures that are designed and configured in such a way are sufficiently known and are widely used in the case of packages of paste-like materials. The injection-molded closure part with the flip-top closure has a projecting sealing cylinder with a calibrated sealing surface. To close the pour opening, the flip-top closure is folded in the direction of the cuff, whereby the sealing cylinder slides into the calibrated pour opening in the neck section of the injection-molded preform and seals it. The injection-molded parts all have calibrated sealing surfaces, which can be produced with very tight tolerances. Unlike the known flip-top closures, which can subsequently be put, for example, on the neck section of a blow-molded container, an exemplary flip-top closure according to the disclosure has only one sealing zone. The production process is simplified, and a more reliable sealing of the closure can be ensured.

The closure part with the flip-top closure, formed integrally with the preform, can have any cross-section. As such, the cuff that surrounds the neck section in an annular manner and the flip-top closure that is integrally fastened via a hinge can be, for example, round, oval or polygonal. As a result, the plastic container that is blow-molded in a subsequent step from the preform can be produced with any cross-sectional shape.

In another exemplary variant embodiment of the preform, an annular circumferential boundary wall can extend from the cuff of the closure part essentially extending the wall of the container body, which boundary wall bounds a collecting volume. The neck section of the preform can project over the cuff in the axial direction. An opening edge that borders the pour opening and an edge of the annular circumferential boundary wall can lie at approximately the same axial height. As an alternative, the neck section can end, for example, approximately 2 mm to 6 mm below the height of the edge of the annular circumferential boundary wall. In the case of the closed flip-top closure, the pour opening and the collecting volume are therefore sealed. In the neck section, recesses are provided, which recesses are arranged at approximately the height of the cuff and form a connection between the collecting volume and the interior of the preform body.

In another exemplary embodiment of the preform according to the disclosure, a cylindrical extension that projects over the neck section can extend from the cuff that surrounds the neck section, which extension can have an outer surface from which a handle part projects and which extends in the direction of the preform bottom. A preform that is configured according to the described variant embodiment makes possible a simple production of a plastic container with an integrated handle part.

Another exemplary variant exemplary embodiment of the preform according to the disclosure can provide that the closure part with the flip-top closure, which is molded-on in one piece onto a cuff that surrounds the neck section via a hinge, has a cylindrical extension that projects over the neck section. In this case, the preform can have a pour extension that is molded-on in one piece, which extension projects over the neck section of the preform and is provided with an axial slot, which extends up to a top side of the cuff. The pour extension can have an opening diameter that corresponds essentially to a diameter of the pour opening in the neck section. By the pour extension already being injected to be integral with the preform, a separate pour extension, which usually is mounted onto the pour opening of the finished blow-molded plastic container, can be eliminated. Sealing problems between the pour extension and the inner wall or the outer wall of the container neck can thus be avoided.

An exemplary plastic container according to the disclosure can be produced by a two-component or multi-component injection-molding method. For example, the production of the preform according to the disclosure is carried out by a stage application technique or by a cube technique. These production methods have been sufficiently tried and tested and make possible an economical and fast production of larger numbers of units.

An exemplary plastic container according to the disclosure is produced from one of the above-described exemplary variants of the preform according to the disclosure by a blow-molding method. The plastic container can have a capacity of, for example, 5 ml to 15 l, preferably 50 ml to 5 l, and especially preferably 100 ml to 1,000 ml. Exemplary plastic containers with a capacity of only 5 ml to 150 ml are, for example, quite especially preferred.

The plastic container can be produced by an injection-blow-molding method or by a blow-molding method that is separated in space and/or time. The injection-blow-molding method can have an advantage that the preform does not have to be removed from the equipment unit from the time when it is produced by the injection-molding method until it is inflated to form the finished plastic container. As an alternative, the preform according to the disclosure can, however, also be intermediately stored, sent to the desired site, and only at a later time be inflated to form a plastic container of the desired shape.

An exemplary variant of the plastic container can be produced from a preform that is axially stretched with the blow-molding method by means of a stretching rod. The additional axial stretching of the preform with a stretching rod can additionally increase the strength of the plastic container that is blow-molded therefrom.

An exemplary method for finishing a preform according to the disclosure has the following method steps:
(i) Injection molding of a closure part that has a flip-top closure in the open position in a first injection mold;
(ii) Optional cooling of the closure part;
(iii) Injection of a preform with a preform body and neck section with a pour opening on the closure part in a second injection mold in such a way that an inner wall of an annular section of the closure part rests directly on an outer surface of the neck section of the preform;
(iv) Cooling of the preform with attached closure part; and
(v) Demolding of the preform with attached closure part from the second injection mold;
wherein all of the foregoing method steps can be carried out in a same machine unit.

A machine unit is defined as an injection-molding machine that houses a tool that can be equipped with different injection molds and optionally also includes a blow-molding tool in order to produce a plastic container from an injection-molded preform by blow molding or stretch blow molding. In this connection, the tool can be a shuttle unit that can be moved in a plane to serve the individual manufacturing stations, or a cube tool that can be rotated to serve the individual manufacturing stations. By adding inserts and/or slides, different cavity geometries can be produced by an injection mold.

An exemplary variant method can provide that the flip-top closure of the closure part is moved from an open position into a position that closes the pour opening of the preform. The moving of the flip-top closure into the closing position can be done in the machine unit. As an alternative, the moving can also be carried out in a separate station, after the preform is removed from the second injection mold.

An exemplary method for the production of a plastic container from a preform according to the disclosure can be carried out by blow molding or stretch blow molding in a machine unit, in which the preform is manufactured. As an exemplary alternative, the manufacturing of the plastic container can also be carried out separated in time and/or space from the production of the preform. In this connection, it is generally necessary that in order to be inflated by blow molding or stretch blow molding the preform be heated again in an oven.

Figure 2:
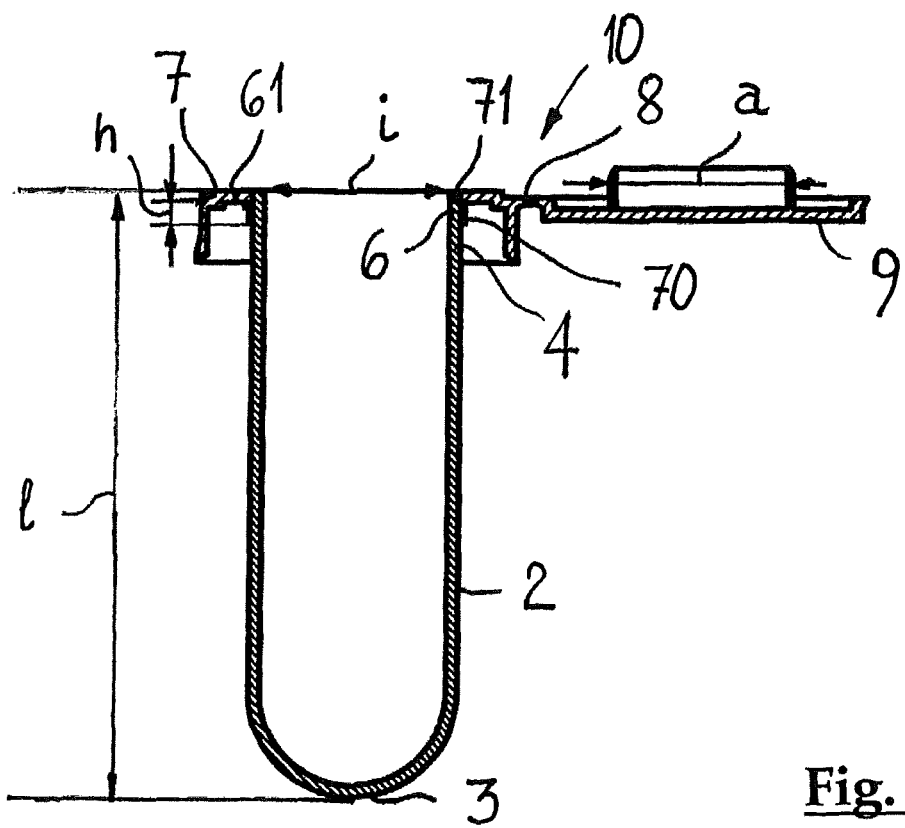
FIG. 2 shows an axial cutaway view of the preform from FIG. 1.

An exemplary preform that is depicted in FIGS. 1 and 2 is provided with the overall reference number 1. It includes a tube-like preform body 2, whose one longitudinal end 3 is configured in a closed manner. The other longitudinal end connects a neck section 4 to a pour opening 5. As can be seen in particular from the axial cutaway view in FIG. 2, the neck section 4 is encompassed in an annular circumferential area 6 by a cuff 7. An inner wall 71 of a section 70 of the cuff 7 rests directly on an outer surface 61 of the annular area 6 of the neck section 4 and surrounds the annular area 6 completely. A so-called flip-top closure 9 is connected to the cuff 7 in one piece via a hinge 8. For example, the hinge 8 is configured as a film hinge. The flip-top closure 9 has a sealing cylinder 92 with a calibrated sealing surface 93 that projects from its bottom 91. For closing the pour opening 5, the flip-top closure 9 is folded in the direction of the cuff 8, whereby the sealing cylinder 92 slides into the pour opening 5 in the neck section 4 of the preform 1 and seals relative to the inner wall 41 of the neck section 4. The cuff 7 and the flip-top closure 9 that is fastened in one piece via the hinge 8 are also referred to below as closure part 10.

The cuff 7 with the flip-top closure 9 that is fastened in one piece via the hinge 8 are produced by an injection-molding method. The preform neck 1 is likewise produced by an injection-molding method. In this case, the production process is carried out in such a way that first the cuff 7 with hinge 8 and flip-top closure 9 are injected. Then, the preform 1 with preform body 2 and neck section 4 is injected. In this case, the inner wall 71 of the surrounding section 70 of the cuff 7 and the outer surface 61 of the annular area 6 of the neck section surrounded by the cuff 7 are connected to one another by injection molding. The connection between the inner wall 71 and the outer surface 61 can be integral and/or frictional and/or positive.

As can be seen from the depicted embodiment, the neck section 4 can end flush with a top side 72 of the cuff 7. The preform 1 has a circular cross-section at least in the annular area 6 of the neck section that is surrounded by the cuff 7. For example, the preform 1 has a circular cross-section over its entire axial longitudinal extension. The cuff 7 and the flip-top closure 9 can have any shape, for example a circular, oval or even polygonal cross-section. The sealing cylinder 92 that projects from the flip-top closure 9 has a circular cross-section and has an outer diameter a, which corresponds to an inner diameter i of the pour opening 5 in the neck section 4.

The cuff 7 with the flip-top closure 9 that is fastened in one piece via the hinge 8 and the preform 1 can include (e.g., consist of) plastic materials that are different from one another. For example, at least 90% of cuff 7, hinge 8 and flip-top closure 9 can include (e.g., consist of) a plastic from the group that consists of polyolefins, in particular polypropylene or polyethylene, polyamide, PET, as well as rubber-like substances, such as, e.g., TPE. The preform 1 can consist of, for example, up to at least 90% of a plastic from the group that consists of PET, PET-G, HDPE, PP, PS, PVC, PEN, PA, copolymers of the cited plastics, bioplastics, such as, for example, PLA or PEF, filled plastics and/or mixtures of the above-mentioned plastics. A condition for the usable plastics is their suitability, on the one hand, for the production of the preform 1 by an injection-molding method and for the subsequent blow-molding method, which can also be, for example, a stretch-blow-molding method, in which the preform 1 is stretched in the axial direction during the blow-molding method additionally by means of an elongated mandrel. The closure part 10 that includes (e.g., consists of) cuff 8, hinge 8 and flip-top closure 9 and the preform 1 can have colors that are different from one another at least in places. As an alternative, the closure part 10 and/or the preform 1 can be configured to be transparent at least in places.

The section 70 of the cuff 7 that surrounds the annular area 6 of the neck section 4 has a height h that is measured in an axial extension direction of the preform 1, which height is, for example, at least 1 mm. The preform 1 has an axial length 1 that is measured over its preform body 2 and the neck section 4, which length is for example, 2 mm to 500 mm, preferably 10 mm to 500 mm. The wall thicknesses of preform in this case correspond to those of known preforms and can, for example, be 0.5 mm to 10 mm. The inner diameter i of the pour opening 5 is, for example, 3 mm to 180 mm, preferably 10 mm to 100 mm.

FIGS. 3 and 4 show two perspective views of a plastic container 21 that is blow-molded from a preform according to FIGS. 1 and 2. The plastic container 21 has a container body 22, which is inflated in conformance with a blow-mold cavity. At the same time, a closed container bottom 23 forms a base for the plastic container 21. The functional part 10 is arranged in a longitudinal end of the plastic container 21 that is opposite to the container bottom 23, which functional part in the depicted embodiment and in conformance with the injection-molded preform (FIG. 1 and FIG. 2) includes (e.g., consists of) the cuff 7 and the flip-top 9 closure that is molded-on in one piece via the hinge 8; the plastic container 21 is produced from the preform by a blow-molding method.

FIG. 3 shows the plastic container 21 in the open state, while FIG. 4 shows the plastic container 21 with a closed flip-top closure 9. Cuff 7 and the flip-top closure 9 that is fastened in one piece via the hinge 8 are also referred to below as closure part 10.

From the axial cutaway view in FIG. 5, it can be seen that the neck section 4 of the preform (1, FIG. 1 and FIG. 2) remains unchanged by the blow-molding method and forms a container neck 24. Section 70 of the cuff 7 of the closure part 10 surrounds the annular area 6 of the neck section 4 or the container neck 24 and is connected to the latter by injection molding. The preform is inflated in a container shoulder 27 in such a way that it rests on a jacket 73 that projects from the cuff 7.

Figure 6:
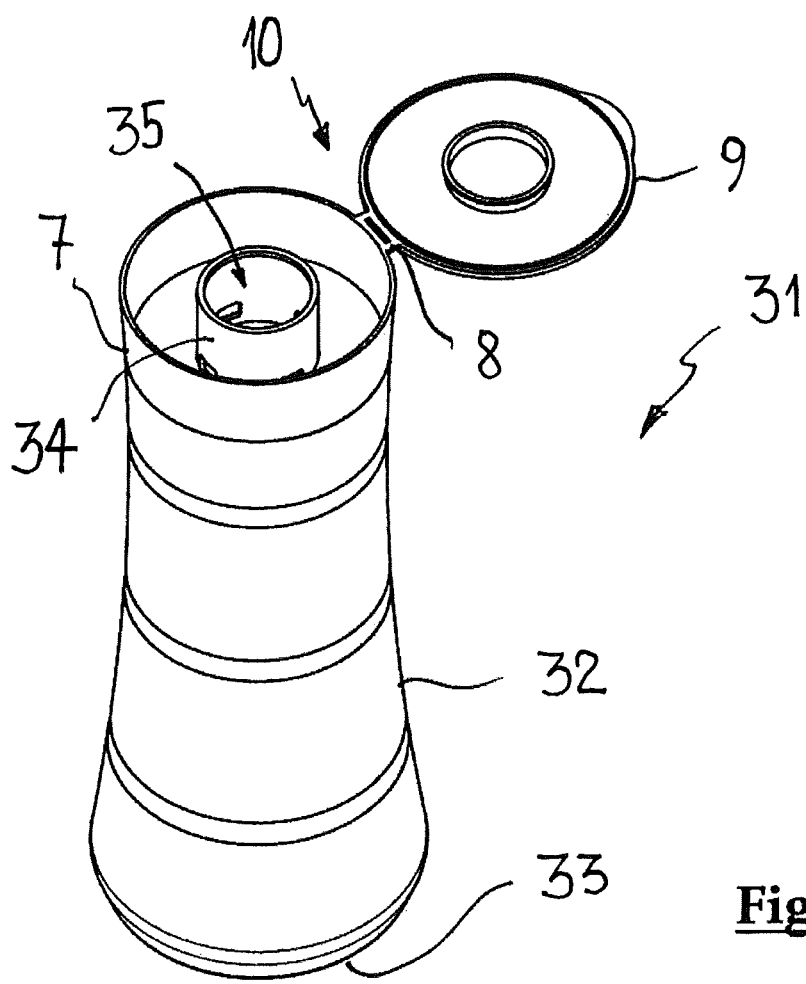
FIG. 6 shows a perspective view of a second exemplary embodiment of a plastic container that is blow molded from a preform according to the present disclosure.
Figure 7:
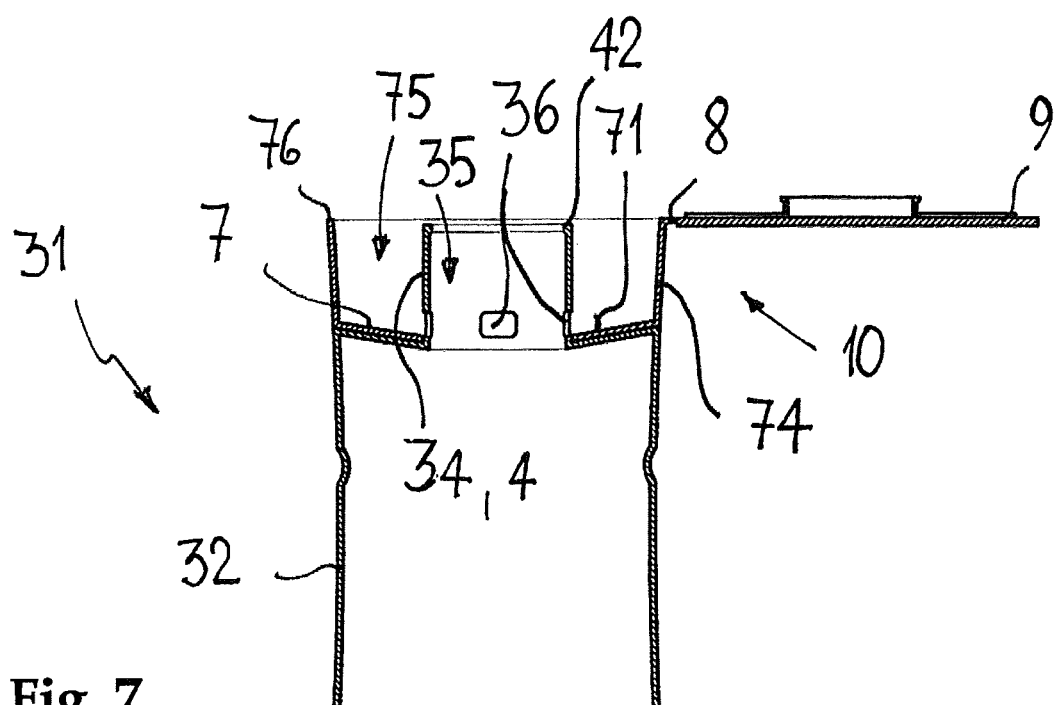
FIG. 7 shows an axial cutaway view of the plastic container according to FIG. 6.

FIGS. 5 and 6 show another exemplary embodiment of a plastic container that is produced from a preform according to the disclosure by a blow-molding method, which is provided with the overall reference number 31. In turn, the plastic container 31 has a container body 32 with a closed container bottom 33. On its longitudinal end that is opposite to the container bottom 33, the container body 32 in turn borders a closure part 10, which has a cuff 7 and a flip-top closure 9 that is fastened in one piece via a hinge 8. An annular circumferential boundary wall 74, which bounds a collecting volume 75, extends from the cuff 7 essentially extending the wall of the container body 32. The neck section 4 of the preform that is obtained unchanged by the blow-molding method now forms a container neck 34, which projects over the cuff 7 in the axial direction. An opening edge 42 that borders the pour opening 5, which now forms a container spout 35, and an edge 76 of the annular circumferential boundary wall 74 lie at approximately the same axial height or the container neck 34 ends, for example, about 2 mm to 6 mm below the height of the edge 76 of the annular circumferential boundary wall 74. In the case of the closed flip-top closure 9, the container spout 35 and the collecting volume 75 are thus sealed. Recesses 36 are provided in the container neck 34, which recesses are arranged at approximately the height of the cuff 7 and form a connection between the collecting volume 75 and the interior of the plastic container 31.

The neck section 4 that projects over the cuff 7 is already formed by injection molding in the preform, which is inflated by the blow-molding method to form the plastic container 31. Also, the recesses 36 in the neck section 4 are already attached to the preform by injection molding. The closure part 10 and the section of the preform that extends above the cuff 7 are no longer changed by the blow-molding method and retain their dimensions that are imposed by the injection molding. Only the section of the preform that extends below the functional part 10 is axially and radially stretched or widened by the blow-molding method. In this case, the part of the neck section 4 of the preform that extends below the closure part 10 in the direction of the preform body is deformed, for example, in such a way that it essentially moves in contact with a bottom of the cuff 7.

Figure 8:
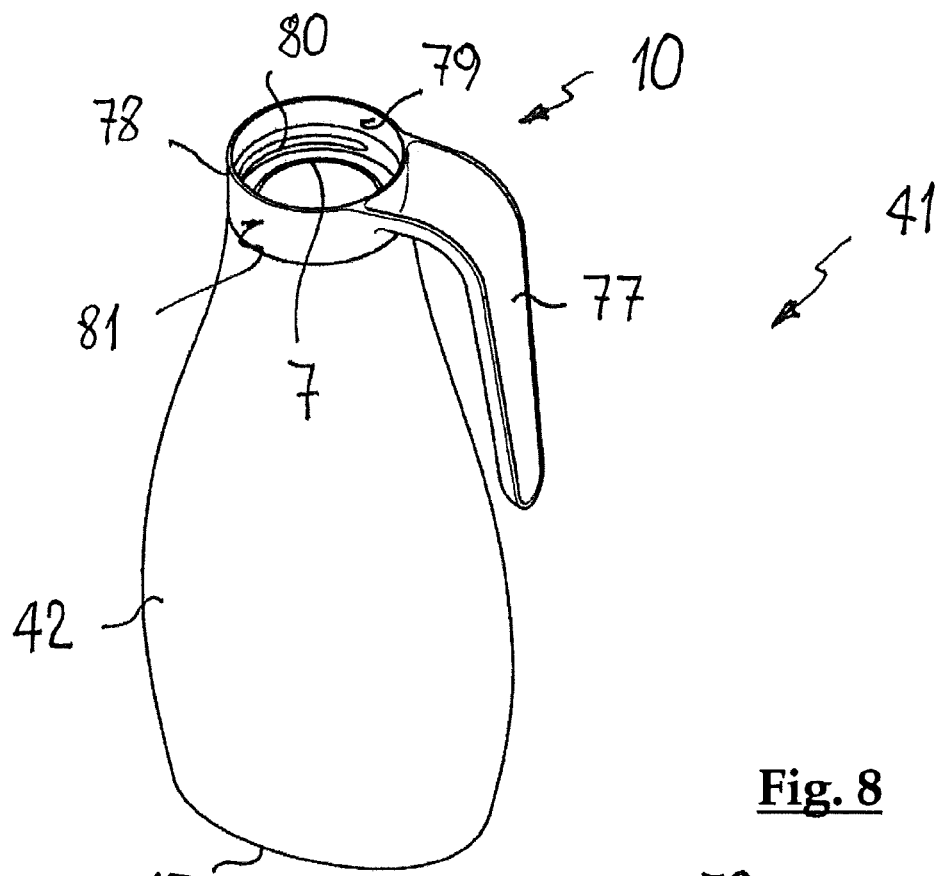
FIG. 8 shows a perspective view of a third exemplary embodiment of a plastic container that is blow molded from a preform according to the disclosure.
Figure 9:
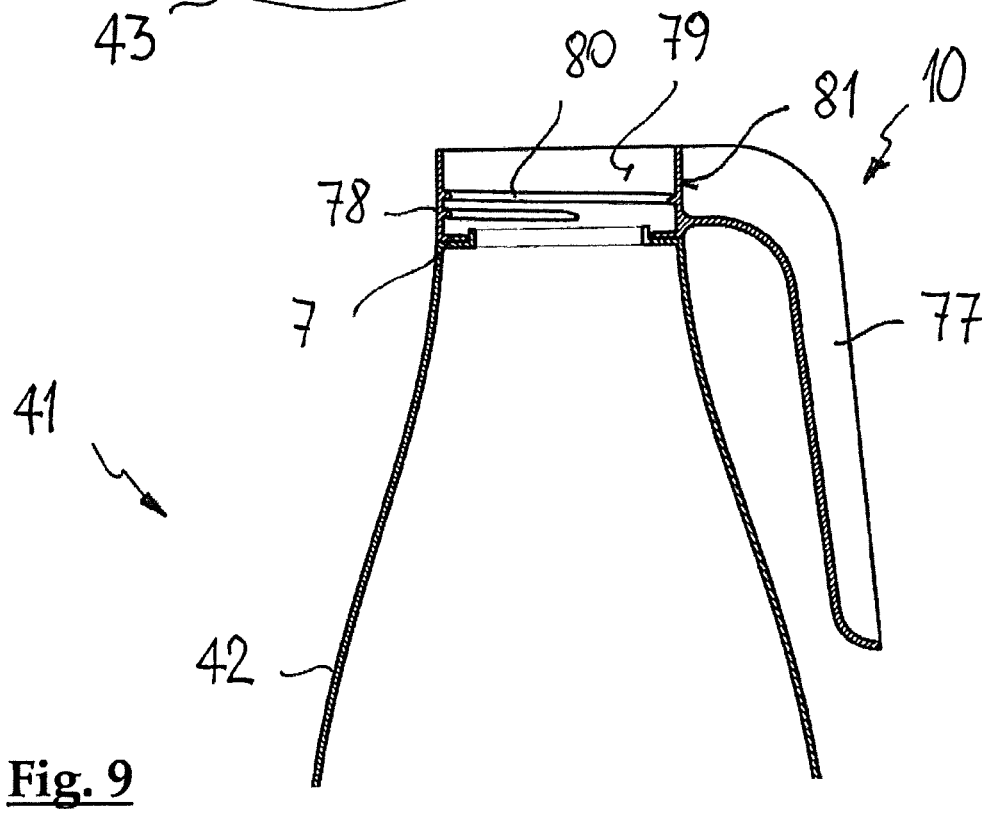
FIG. 9 shows an axial cutaway view of the plastic container according to FIG. 8.

FIG. 8 and FIG. 9 show another embodiment of a plastic container 41 that is produced from a preform according to the disclosure. The plastic container 41 has a container body 42, to which a closure part 10 with a molded-on handle part 77 connects. In turn, the functional part 10 can be configured as a cuff 7 that surrounds the neck section. A cylindrical extension 78 projects axially from the top 72 of the cuff 7, which extension 78 has an inner surface 79, in which means 80 for positive clamping of a separate cover that is equipped with corresponding engagement means are made. The means 80 on the inner surface 79 of the cylindrical extension 78 and the corresponding engagement means are, for example, threaded sections and corresponding threaded grooves. In this case, threaded grooves or threaded sections can be attached in the inner surface 79. As an alternative, the means for positive clamping of a separate cover that is equipped with corresponding engagement means can also be a groove or an engagement projection of a bayonet closure. In accordance with the above-described embodiments, the closure part, however, can also include a flip-top closure that is fastened to the cuff via a hinge (not shown).

The handle part 77 projects from an outer surface 81 of the cylindrical extension 78 and extends in the direction of a container bottom 43. The closure part 10 with molded-on handle part 77 and cylindrical extension 78 with positive means 80 for positive clamping of a separate cover that is equipped with corresponding engagement means can be produced by an injection-molding method and can be connected by injection molding to the preform, from which the plastic container is blow molded. The closure part 10 is no longer changed by the blow-molding method and retains its dimensions that are imposed by the injection molding. Only the section of the preform that extends below the closure part 10 is axially and radially stretched or widened by the blow-molding method. In this case, the part of the neck section 4 of the preform that extends below the closure part 10 in the direction of the preform body is deformed, for example, in such a way that it essentially moves in contact with a bottom of the cuff 7.

Figure 10:
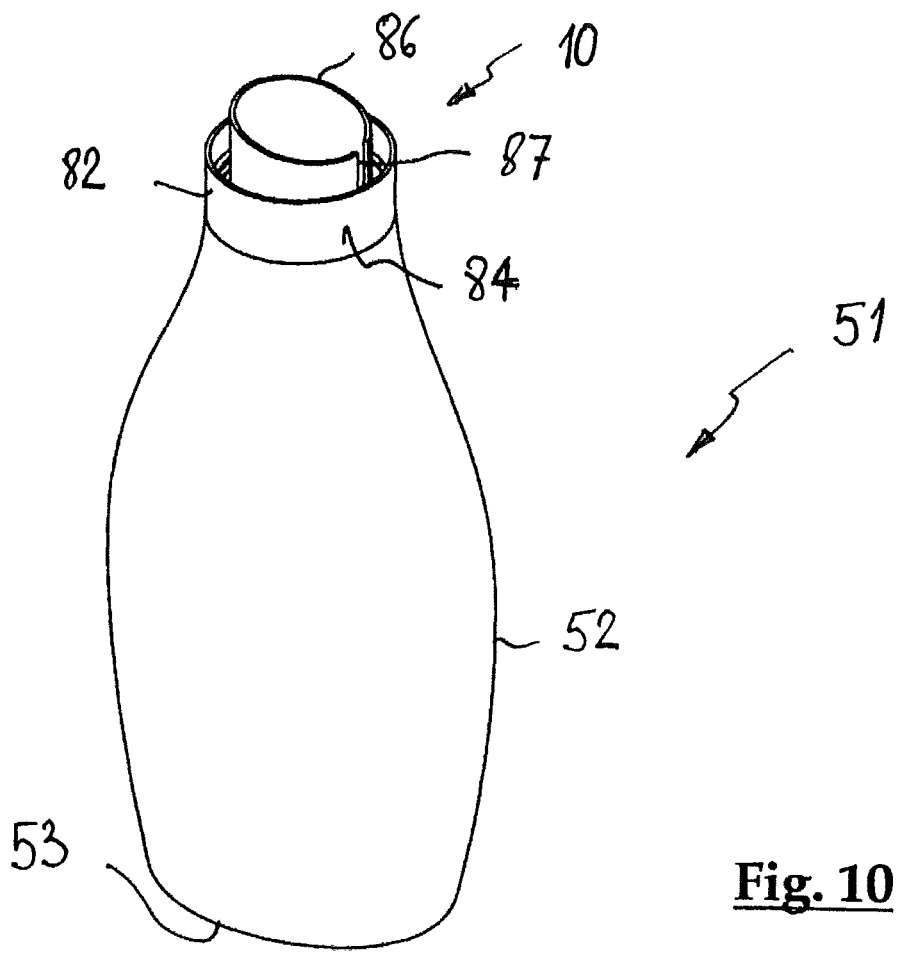
FIG. 10 shows a perspective view of another exemplary embodiment of a plastic container that is blow molded from a preform according to the present disclosure.
Figure 11:
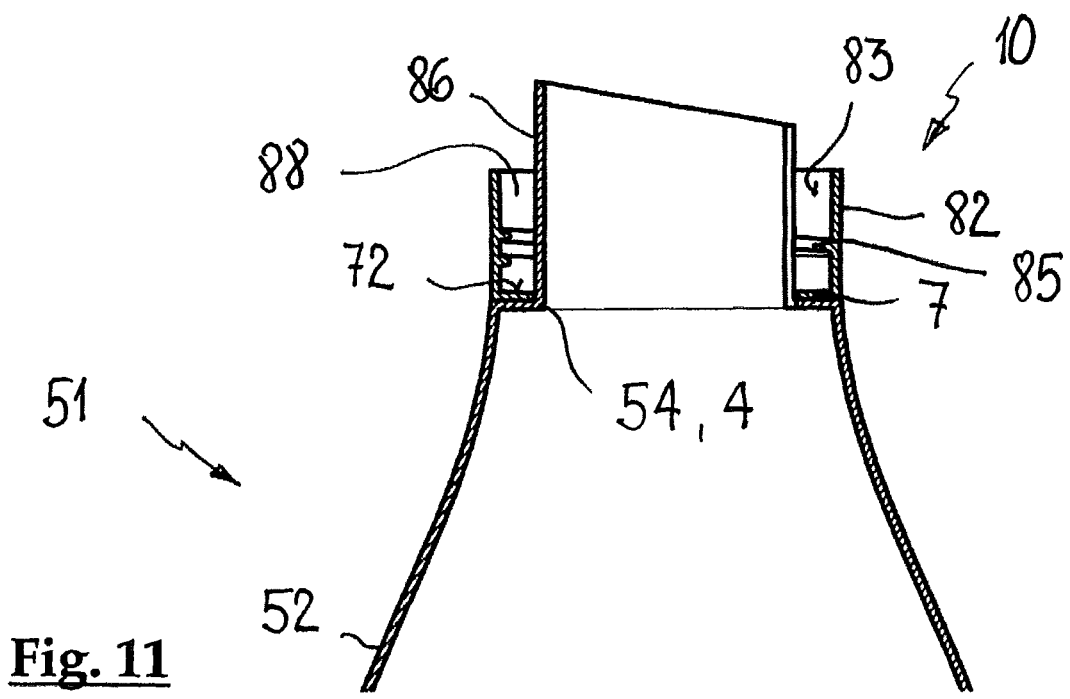
FIG. 11 shows an axial cutaway view of the plastic container according to FIG. 10.

FIG. 10 and FIG. 11 show another exemplary embodiment of a plastic container 51, which is produced by a blow-molding method from a preform according to the disclosure. In turn, the plastic container 51 has a container body 52, which is closed by a container bottom 53, which at the same time forms a base for the plastic container 51. The plastic container 51 carries the functional part 10 on a longitudinal end of the container body that is opposite to the container bottom 53. The functional part 10 has a cuff 7, from whose top 72 a cylindrical extension 82 projects. In turn, means 85 for positive clamping of a separate cover that is equipped with corresponding engagement means are configured on an inner surface 83 of the cylindrical extension 82. The means 85 for positive clamping of a separate cover that is equipped with corresponding engagement means can be, for example, threaded sections and corresponding threaded grooves. In this case, threaded grooves or threaded sections can be attached in the inner surface 83. As an alternative, the means for positive clamping of a separate cover that is equipped with corresponding engagement means can also be configured as a groove or an engagement projection of a bayonet closure. The means for positive clamping of a separate cover that is equipped with corresponding engagement means can, however, also be configured on an outer surface 84 of the cylindrical projection 82. In accordance with the above-described embodiments, in this case, there can be a flip-top closure that is fastened to the cuff 7 in one piece via a hinge (not shown). The cuff 7 and the flip-top closure that is fastened in one piece via the hinge can in turn be referred to as a closure part 10.

A pour extension 86 projects over the top 72 of the cuff 7. The pour extension 86 is connected in one piece to the neck section 4 of the preform, which forms a container neck 54 with the blow-molded plastic container 51. The pour extension 86 has an opening diameter that corresponds essentially to a diameter of the pour opening in the neck section 4, which forms the container neck 54. By the pour extension 86 already being injected to be integral with the preform, a separate pour attachment, which is, for example, mounted in the container opening of the finished blow-molded plastic container, can be omitted. The molded-on pour extension 86 has an axial slot 87, which extends up to the cuff 7. As a result, excess material, which can collect in an annular space 88 that is bound by the pour extension 86 and the cylindrical extension 82, can flow back again into the interior of the plastic container.

In exemplary embodiments, the closure part 10 and the sections of the preform that extend above the cuff 7 are no longer changed by the blow-molding method and retain their dimensions that are imposed by the injection molding. Only the section of the exemplary preform that extends below the closure part 10 is axially and radially stretched or widened by the blow-molding method. In this case, the part of the neck section 4 of the preform that extends in the direction of the preform body below the closure part 10 is deformed, for example, in such a way that it essentially moves in contact with a bottom of the cuff 7.

The above-described embodiments for a plastic container according to the disclosure can be produced by a two-component or multi-component injection-molding method from a preform according to the disclosure with a closure part that is connected by injection molding. In this case, for example, the preform can be produced by a stage application technique or by a cube technique. These production methods have been sufficiently tried and tested and make possible an economical and fast production of larger numbers of units. The plastic container can then be produced from the preform by an injection-blow-molding method or by a blow-molding method that is separated in space and/or time. In this case, the preform can be axially stretched during the blow-molding method by means of a stretching rod. The injection-blow-molding method can have the advantage that an exemplary preform according to the disclosure does not have to be removed from the equipment unit from the time when it is produced by the injection-molding method until it is inflated to form the finished plastic container. As an alternative, however, an exemplary preform according to the disclosure can also be intermediately stored, transported to the desired site, and only at a later time be inflated to form a plastic container of the desired shape.

A plastic container according to the disclosure can have an exemplary capacity of 20 ml to 15 l, preferably 50 ml to 5 l, especially preferably 100 ml to 1,000 ml, and quite especially preferably 5 ml to 150 ml.

Exemplary embodiments disclosed herein have been explained based on various embodiments in which a closure part, which can have a variable shape depending on its function, and a preform with a preform body and preform neck are connected by injection molding to form a structural whole. For example, the closure part that includes a cuff and a flip-top closure that is fastened in one piece via a hinge is no longer changed by the blow-molding method and retains its dimensions that are imposed by the injection molding. Only the section of the preform that extends below the closure part is axially and radially stretched or widened by the blow-molding method. The above description of concrete embodiments serves only to explain aspects of the present invention and is not to be considered as limiting.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. An injection-molded preform for production of a blow-molded plastic container, the preform comprising:
   an elongated, tubular preform body, which is closed on one longitudinal end and which has a neck section that is provided with a pour opening on another longitudinal end, the neck section having an outer surface; and
   an injection molded closure part which includes a flip-top closure, a hinge and a cuff having an annular section with an inner wall, the flip-top closure is fastened in one piece to the cuff via the hinge
   wherein said inner wall rests directly on the outer surface of the neck and completely encloses an annular area of the outer surface
   and the neck section includes an injection molded connection to the injection molded closure part, wherein the injection molded connection is produced by injection molding the outer surface of the neck of the tubular preform directly onto the inner wall of the annular section of the cuff of the injection molded closure part and results in an elimination of a sealing zone between the closure part and the preform
   wherein the flip-top closure has a sealing cylinder which projects from a bottom of the flip-top closure and which, for closing the pour opening of the neck section of the preform, slides into the pour opening of the preform.

2. The preform according to claim 1, wherein the closure part in an attachment area is connected in a positive manner to the enclosed annular area of the outer surface of the neck section.

3. The preform according to claim 1, wherein the closure part in an attachment area is connected by friction to the enclosed annular area of the outer surface of the neck section.

4. The preform according to claim 1, wherein the closure part in an attachment area is connected integrally by at least partial melting of the closure part's inner wall that rests on the outer surface of the neck section, to the annular area of the outer surface of the neck section.

5. The preform according to claim 1, wherein at least 90% of the closure part is a plastic selected from the group that consists of polyolefins, polypropylene or polyethylene, polyamide, PET, PEF, and rubber substances, including TPE.

6. The preform according to claim 1, wherein at least 90% of the preform body with neck section is a plastic selected from the group that consists of PET, PET-G, HDPE, PP, PE, PS, PVC, PEN, PA, copolymers of the cited plastics, bioplastics, PLA, PEF, filled plastics, mixtures of the above-mentioned plastics, mixtures of PP and PE.

7. The preform according to claim 1, wherein the closure part and the preform consist of plastic materials that are different from one another.

8. The preform according to claim 1, wherein the closure part and the preform body with neck section have colors that are different from one another at least in places.

9. The preform according to claim 1, wherein the closure part and/or the preform body with neck section are transparent at least in places.

10. The preform according to claim 1, wherein the section of the closure part that completely encloses the annular area of the outer surface of the neck section has a height that is measured in an axial extension direction of the preform, which is at least 1 mm.

11. The preform according to claim 1, wherein the preform body with neck section has an axial length, which is 2 mm to 500 mm.

12. The preform according to claim 1, wherein the pour opening in the neck section has a diameter that is 3 mm to 180 mm.

13. The preform according to claim 1, wherein the inner wall of the closure part that rests on the outer surface has an inner contour, which is different from an outer contour of the closure part.

14. The preform according to claim 1, wherein the closure part comprises:
   a collecting volume that is enclosed by an annular boundary wall, which extends axially from a top side of the cuff, and the neck section of the preform projects axially over a top of the cuff, whereby the annular boundary wall and the neck section end at approximately a same height, and recesses are made in the neck section, at approximately the height of the cuff, which recesses form a connection between the collecting volume and an interior of the preform body.

15. The preform according to claim 14, wherein the cuff and the flip-top closure that is fastened in one piece via the hinge have a cross-section that is round, oval or polygonal.

16. The preform according to claim 1, wherein the cuff has an essentially cylindrical extension with an inner surface and an outer surface that projects over the neck section and from which projects a handle part, which extends in the direction of the preform bottom.

17. The preform according to claim 1, wherein the cuff has an essentially cylindrical extension that projects over the neck section, which extension has an inner surface or an outer surface, and with a pour extension that is injection molded to be integral with the preform, which extension projects over the neck section of the preform and is provided with an axial slot, which extends up to a top side of the cuff, whereby the pour extension has an opening diameter that corresponds essentially to a diameter of the pour opening in the neck section.

18. The preform according to claim 1, which is configured as a two-component or multi-component injection-molded preform.

19. A blow-molded plastic container produced from the preform according to claim 1.

20. The plastic container according to claim 19, comprising:
   an interior with a capacity of 5 ml to 3,000 ml.

21. The plastic container according to claim 20, which is configured as an injection-blow-molded container or as a blow-molded container.

22. The plastic container according to claim 21, which is configured from a preform that is an axially extended, blow-molded preform.

\* \* \* \* \*